United States Patent
Sabin

(10) Patent No.: US 9,479,338 B2
(45) Date of Patent: Oct. 25, 2016

(54) METHOD AND SYSTEM FOR CERTIFICATE DISCOVERY AND RANKING CERTIFICATE AUTHORITIES

(71) Applicant: DigiCert, Inc., Lehi, UT (US)

(72) Inventor: Jason Allen Sabin, Lehi, UT (US)

(73) Assignee: Digicert, Inc., Lehi, UT (US)

( * ) Notice: Subject to any disclaimer, the term of this patent is extended or adjusted under 35 U.S.C. 154(b) by 0 days.

(21) Appl. No.: 14/659,889

(22) Filed: Mar. 17, 2015

(65) Prior Publication Data

US 2016/0277193 A1 Sep. 22, 2016

(51) Int. Cl.
*H04L 29/06* (2006.01)
*H04L 9/32* (2006.01)
*G06F 17/30* (2006.01)

(52) U.S. Cl.
CPC ....... *H04L 9/3263* (2013.01); *G06F 17/30864* (2013.01); *H04L 9/3265* (2013.01); *H04L 9/3268* (2013.01); *H04L 9/3294* (2013.01)

(58) Field of Classification Search
CPC . H04L 9/3263; H04L 9/3265; H04L 9/3268; H04L 9/3294; G06F 17/30864
See application file for complete search history.

(56) References Cited

U.S. PATENT DOCUMENTS

| | | | | |
|---|---|---|---|---|
| 6,898,707 | B1 * | 5/2005 | Sit | G06F 21/602 713/167 |
| 7,739,494 | B1 * | 6/2010 | McCorkendale | H04L 63/0823 713/152 |
| 8,032,744 | B2 * | 10/2011 | Doonan | G06F 21/64 380/286 |
| 8,103,761 | B2 * | 1/2012 | Adelman | H04L 29/12066 709/222 |
| 8,285,816 | B2 * | 10/2012 | Adelman | H04L 29/12594 709/218 |
| 2003/0007646 | A1 * | 1/2003 | Hurst | H04N 7/1675 380/285 |
| 2005/0005097 | A1 * | 1/2005 | Murakawa | H04L 63/0442 713/156 |
| 2006/0200487 | A1 * | 9/2006 | Adelman | G06Q 10/107 |
| 2007/0022162 | A1 * | 1/2007 | Thayer | H04L 12/58 709/206 |
| 2007/0022291 | A1 * | 1/2007 | Thayer | H04L 12/58 713/176 |
| 2008/0028443 | A1 * | 1/2008 | Adelman | G06Q 10/107 726/4 |
| 2010/0250948 | A1 * | 9/2010 | Little | H04L 12/58 713/175 |
| 2011/0283357 | A1 * | 11/2011 | Pandrangi | H04L 63/1416 726/22 |
| 2012/0124375 | A1 * | 5/2012 | Truskovsky | H04L 9/3263 713/168 |
| 2012/0209890 | A1 * | 8/2012 | Nowacki | G06F 17/30536 707/805 |
| 2012/0215754 | A1 * | 8/2012 | Marzani | F02D 41/266 707/705 |
| 2012/0216253 | A1 * | 8/2012 | Cahn | G06F 21/33 726/3 |
| 2014/0032589 | A1 * | 1/2014 | Styler | G06F 17/3097 707/767 |
| 2014/0095866 | A1 * | 4/2014 | Grebennikov | H04L 9/3263 713/156 |
| 2014/0237582 | A1 * | 8/2014 | Niemela | H04L 63/0823 726/10 |
| 2015/0213131 | A1 * | 7/2015 | Styler | G06F 17/30864 707/767 |
| 2016/0036593 | A1 * | 2/2016 | Saboori | H04L 63/0823 713/156 |

* cited by examiner

*Primary Examiner* — Hadi Armouche
*Assistant Examiner* — Sher A Khan
(74) *Attorney, Agent, or Firm* — Strong & Hanni

(57) ABSTRACT

Certificate detectors scan a network for certificate resource information and send the information to a certificate database. A correlation engine extracts and correlates this information. A ranker uses the information about the certificates and certificate authorities to generate and provide a security score and/or ranking. A requester may view the certificate ranking and/or and certificate authority ranking after passing a domain validation authorization. An Internet browser may obtain a security score and/or ranking for a certificate authority and, based on this information, may determine to trust or not trust some or all certificates issued by that certificate authority, or to require corroborating evidence before trusting a certificate.

20 Claims, 2 Drawing Sheets

METHOD AND SYSTEM FOR CERTIFICATE DISCOVERY AND RANKING CERTIFICATE AUTHORITIES

BACKGROUND

Digital Certificates ("certificates") are critical to Internet security. Certificates are electronic files that make it possible for information to be transferred privately over the Internet. Such information may include personal identifying information, individually identifiable health information, proprietary information, and confidential information. Certificates provide peace of mind to Internet users by verifying the identity of the destination to which a user is sending sensitive or confidential information.

Certificates are issued by Certificate Authorities ("CA"s), or by trusted intermediaries of CAs. As used herein, a CA may also include an intermediary of a CA. An intermediary CA of a root CA is trusted and operated by the root CA, and issues certificates on behalf of the root CA. A CA issues a certificate, encrypted with the CA's private key, to a requesting website operator after the CA has taken measures to verify the identity of the website operator. The thoroughness of this verification varies widely across different CAs.

A website operator may request and obtain certificates from multiple CAs for purposes of redundancy and also because not all browsers trust all CAs. A website operator is motivated to use only trustworthy CAs to promote the widespread usage by browsers of these trustworthy CAs.

When an Internet user visits the website, the website presents its certificates to the user to verify its identity to the visiting Internet user. When presented with a certificate, an Internet user, generally through a browser such as Internet Explorer, Chrome, or Firefox, consults its list of trusted CAs. If this list of trusted CAs includes the CA that issued the certificate, then the Internet user will decrypt the certificate with the CA's public key, and will generally believe the information in the certificate, i.e., the Internet user will believe that the website is operated by the entity identified in the certificate.

Browsers frequently maintain lists of CAs that it trusts and CAs that it does not trust. These lists may range from very few CAs to numerous CAs, for both the trusted and untrusted CAs. Accurately distinguishing trusted from untrusted CAs is of utmost importance; if even one of the browser's trusted CAs provides a bad certificate, a security compromise has occurred. This compromise may result in an Internet user providing sensitive information to a malicious entity, or other undesirable consequences. Browsers generally apply a binary classification system to CAs: "trusted" or "untrusted," and all "trusted" CAs are equally trusted, i.e., the browser does not trust any "trusted" CA more than any other "trusted" CA.

This binary classification system does not reflect the real world—in which the trustworthiness of a CA varies continuously on a spectrum ranging from completely untrustworthy to completely trustworthy, and all levels of trust in between. While some CAs have stringent requirements for issuing a certificate, other CAs have practices that can result in poorly-secured certificates. For example, some CAs may do nothing more than make a quick phone call or do a quick Internet check to verify the identity of a domain owner, while other CAs may investigate the alleged physical location of the entity owning the CA, or send/receive mail to the location, or verify identity through third party systems or resources. As mentioned above, reliance on a CA that issues poorly-secured certificates is a dangerous security risk for Internet user, and may result in an Internet user disclosing sensitive information to a phishing website masquerading as a reputable entity. For example, an untrustworthy CA may issue a certificate indicating that the domain www.anazon.com ("anazon" instead of "amazon") is operated by Amazon, when in reality anazon is operated by thieves attempting to obtain a user's credit card information.

It would be beneficial to Internet users, browsers, internetworking agents, website administrators, server operators—or any other party which may be vulnerable to or otherwise have an interest in security compromises resulting from untrustworthy CAs—to employ a method and system for assigning scores to CAs and ranking CAs in a manner that reflects the varying levels of trustworthiness, instead of concluding that every CA is either "trusted" or "untrusted." Using a ranking system, a browser or other entity, as identified above, could increase security by relying more heavily the most trustworthy CAs, and turning to less trustworthy—although still worthy of some trust—CAs only when necessary. In some cases, even though two CAs may both be worthy of some trust, one may be worthy of more trust than the other, as in the case where one of the CAs has been previously compromised, or may have previously mis-issued certificates, or issued certificates for phishing websites, or manifested other signs of untrustworthiness. In some circumstances, a browser or other entity may continue to trust a CA simply because it is a big CA, and a widely accepted and trusted CA, without any analysis as whether the CA is worthy of trust. What is needed is a system and method for granularly assigning security scores and ranking CAs, and for using this scoring and ranking system to increase security.

SUMMARY OF THE INVENTION

This invention discloses teaches a method and system for discovering certificate resource information on one or more public or private networks, analyzing the certificate resource information, assigning a score to one or more certificates or certificate authorities, and presenting the results to an interested party. The interested party may be an Internet user, network client, browser, client networking agent, website operator, server operator, domain owner, network security administrator, entity using a certificate to authenticate its website, or any other party having in interest in certificate or CA trustworthiness. Based on the results, one or more of these interested parties are able to measure trustworthiness of certificates and CAs, identify security vulnerabilities, and generally improve security aspects relating to certificate issuance and use.

Although the discussion herein discusses browsers as an exemplary entity that may benefit from the invention disclosed herein, any of the entities identified above—e.g., Internet user, network client, browser, client networking agent, website operator, server operator, domain owner, network security administrator, entity using a certificate to authenticate its website, or any other party having in interest in certificate or CA trustworthiness—may derive analogous benefits. A browser is merely an exemplary entity employed for convenience in describing the invention herein.

For example, a browser may determine that, while multiple CAs may be worthy of some level of trust, some of these CAs are more or less trustworthy than others. A browser may rely more heavily on a higher-ranked CA, such as by requiring only one certificate validation when the certificate is from a higher-ranked CA, or by trusting the CA over many or all websites, domains, or network destinations.

For a lower-ranked CA, a browser may require a corroborating certificate validation, or may conduct frequent checks or analyses regarding the ongoing trustworthiness of a particular CA, or may trust a CA for only a subset of websites, domains, or network destinations.

In one aspect, the process is initiated when an entity doing the certificate discovery and CA ranking and grouping service (hereinafter "ranking and grouping service"), such as a CA, or policing entity, or other ranking authority, instructs certificate detectors to scan a network, or subset of a network, or multiple networks, or any other resources with certificate resource information. The certificate detectors acquire certificate resource information as they scan the network for certificates. The located certificate resource information is transferred to a certificate database. The certificate database may be located on the cloud, on a requester's network, or in any location capable of holding certificate resource information.

Once the certificate resource information is stored in the certificate database, a correlation engine extracts data from the certificate resource information to correlate and/or organize the certificate resource information. Either the ranking service or the requester may define what data the correlation engine should extract and organize from the certificate resource information.

Certificates and certificate resource information may then be assigned a ranking or organized into groups based on the extracted data from the correlation engine. The service provides a CA ranking based on metrics such as whether the certificates issued by a CA is on a phishing or malware site, or have any insecure attributes, or have internal names included within the certificate's subject alternative name field. The certificates may also be organized into groups based on categories requested by the service or the requester.

A ranker can then assign a security score and/or ranking to a CA based on the certificates issued by the CA. In addition, other metrics may be used to rank a CA, including bad news reports about the CA or poor online reviews about the CA.

Third-party requesters ("requesters"), such as Internet users, browsers, security administrators of an organization, or network clients, may then request to view the ranking of the certificates and/or the CAs. The requesters may be required to first pass a domain validation authorization ("DVA") to prove the requester is authorized to view information about the certificates. This steps ensures that a ranking service does not compromise confidential certificate resource information by providing the certificate information to the requester. If the requester passes the DVA, the requester is allowed to view information about each domain for which they have passed authorization, including the ranking of the certificates and CAs. This information will assist the requester in determining the benefits and/or risks associated with the continued use of a certificate or a CA and locate any security issues that may exist in the requester's infrastructure.

DETAILED DESCRIPTION OF THE INVENTION

The invention is a method and system for determining the relative or absolute trustworthiness of a CA or of issued certificates. Several exemplary embodiments are described herein.

Each of the components described herein may refer to a software package, virtual appliance, hardware system, or other apparatus or process that can perform the described function. Although described as separate components or systems, the components could be combined in various ways and still remain within the scope of the invention.

This invention discloses a method and system for determining the relative or absolute trustworthiness of a CA. Based on the relative or absolute trustworthiness of a CA, an interested entity, e.g., a web browser or agent, may determine whether, in what degree, and in what manner to rely on a particular CA.

Trustworthiness of CAs may be determined by assigning a security score to the CA. Although referred to as a "security score" herein, the score could be used for analyses unrelated to, or only partially related to, security. The security score may be determined by obtaining or gathering certificate resource information from one or more networks or other resources, analyzing the obtained certificate resource information, and using the analyzed certificate information to determine a security score for a certificate authority.

Figures 1A, 1B:
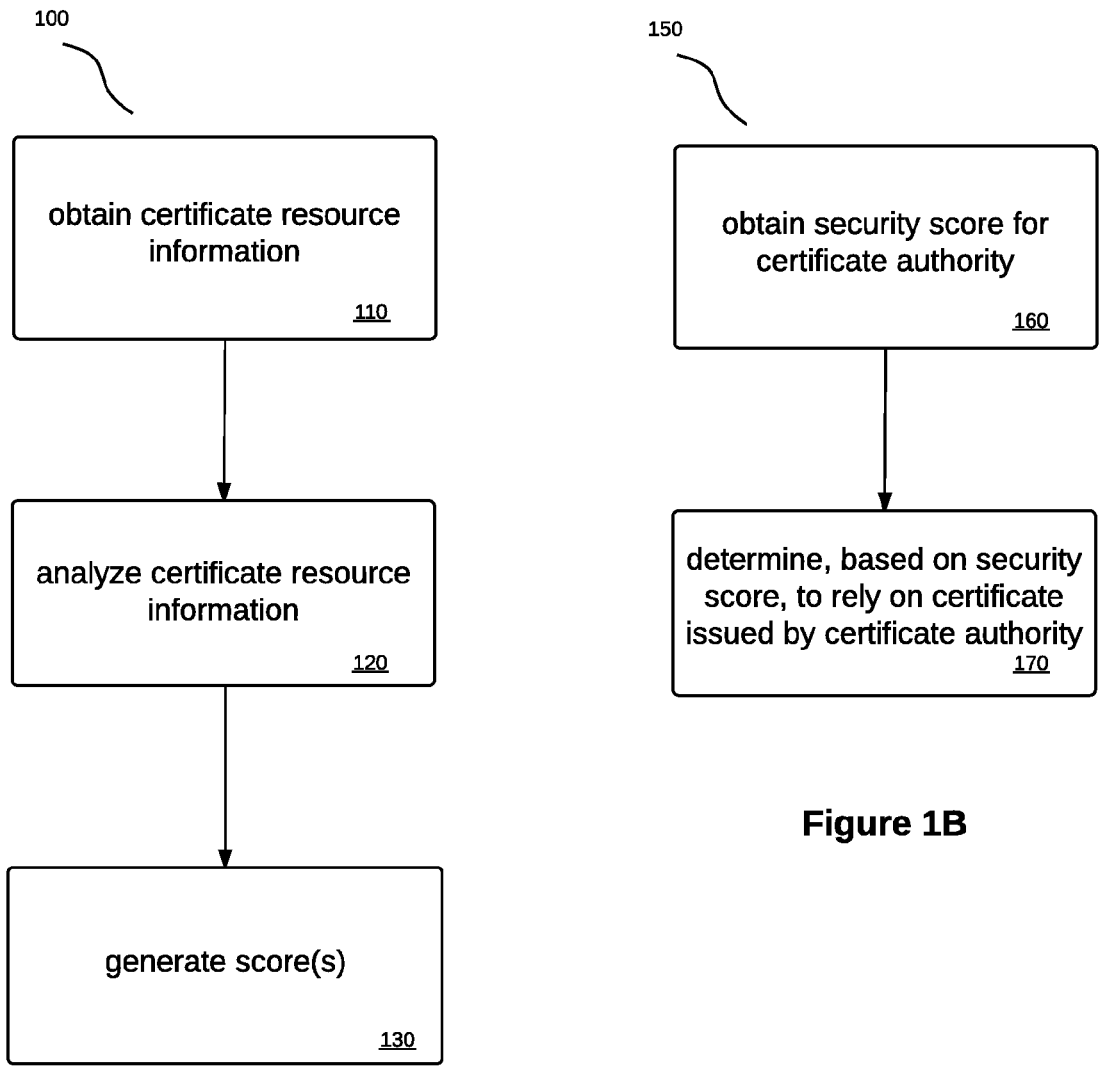
FIG. 1A shows a flowchart illustrating one embodiment for assigning a security score to a certificate authority.
FIG. 1B shows a flowchart for obtaining a security score for a certificate authority and using the security score to rely on a certificate issued by the certificate authority.
Figure 2:
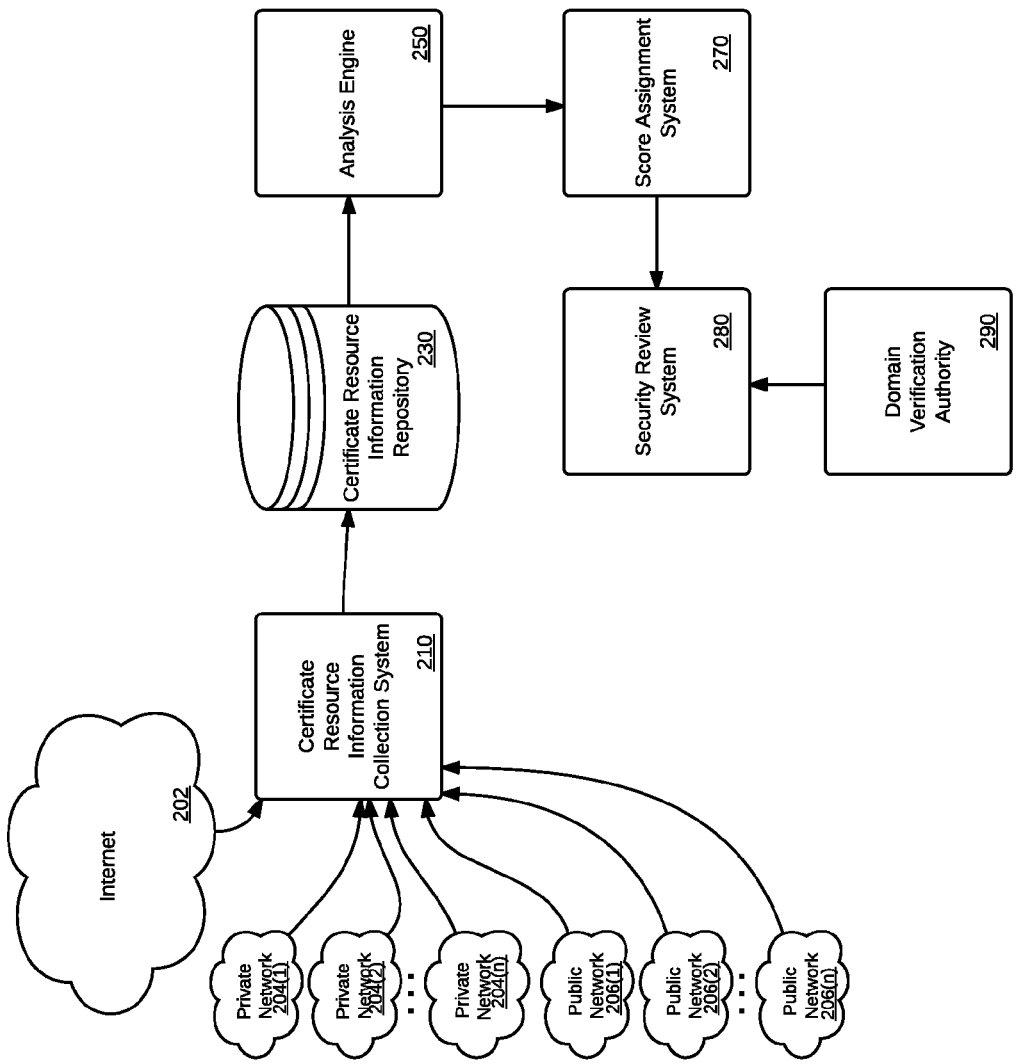
FIG. 2 depicts a diagram of possible components used by the flowchart shown in FIG. 1.

FIG. 1A shows an exemplary process 100 for implementing the invention. FIG. 2 shows exemplary components for implementing the invention. Flowchart 100 is not intended to impose any ordering on the steps, but merely shows an exemplary embodiment of the invention.

Referring now to FIGS. 1 and 2, at step 110, Certificate Resource Information Collection System 210 obtains certificate resource information from one or more networks such as Internet 206, private networks 202, and/or public networks 204. These networks may be public or private, and may be designed, implemented, and administered in many ways, as is well known to a person of ordinary skill in the art.

Certificate Resource Information Collection System 210 may employ various means to collect certificate information from one or more networks. For example, a certificate detector may be employed to gather certificates. A certificate detector is any component or application, software, hardware, or any combination of software and hardware, that scans a network to locate and collect certificates. A certificate detector may be a web crawler, internet bot, a human user performing a manual search for certificates, or any other means of searching for and locating certificates on a network.

A certificate detector may be designed to search for all certificates and certificate resource information or for only specific types of certificates and certificate resource information. Certificate resource information associated with a certificate includes, but is not limited to, the issuing CA, the issuance date, the earliest validity date, the expiration date, the domain, and the name of the entity operating the domain. Certificate resource information associated with a certificate may also include the location where a certificate was found and the time at which it was found and stored. A certificate detector may be developed, distributed, and/or controlled by any entity.

Networks may include the Internet or other publicly accessible network, or any type of internal network such as a LAN, WAN, or SAN, or any other network of computing devices.

Identified certificates and/or certificate resource information are sent to and stored in Certificate Resource Information Repository 230, which may comprise a database or other data storage scheme in the cloud, on a local server, on a remote server, on any other device capable of storing data, or any combination of data storage solutions.

All, or a subset, of the collected certificate resource information may be stored in Certificate Information Repository 230.

In step 120 of FIG. 1, Analysis Engine 250 analyzes some or all of the certificate resource information in Certificate Information Repository 210. Analysis Engine 250 is a component capable of analyzing the data in the certificate information repository, and may be software, hardware, or a combination of software and hardware.

Analysis Engine 250 may extract and analyze some or all of the certificate resource information in Certificate Information Repository 210. The extracted and analyzed information may be on a certificate-by-certificate based, or may be common to multiple certificates, or may be by domain, or may be by CA, or may not be specific to one or more certificates. For a certificate, Analysis Engine 250 may extract the issuing certificate authority, the intermediate issuing certificate authority, the domain, the earliest validity date, the expiration date, any other information contained in the certificate.

Analysis Engine 250 perform several types of analysis. For example, Analysis Engine 250 may include determining one or more of whether a domain associated with a certificate is a phishing attempt. This may be done by feeding a domain name into a phishing generation engine, which includes a list of rules to generate phishing variants of a domain name (e.g., phishing variants of www.domain.com may include www.d0main.com, www.d0m41n.com, www-.domain.coom, www.doomain.com, and many other variants). These variants may be compared with a database of known phishing domains. Analysis Engine 250 may also determine whether a particular CA has issued any certificates for the domains identified in the phishing generation engine by querying the CA (e.g., the CA's repository/db) or other source for certificates the CA has issues.

Analysis Engine 250 may determine that a certificate has a suspicious or irregular configuration. Analysis Engine 250 may make this determination by comparing the certificate to any baseline or profile, or by using other criteria. Examples of such irregularities are well-known in the art. For example, a CA may issue certificates that do not abide the latest security standards, e.g., by using weak key lengths or hashing algorithms. A certificate may lack revocation controls such as the AIA field, which is used in OCSP revocation checking to confirm that a certificate has not been revoked. Another irregularity may be a determination that, even though a certificate is properly configured and of high quality, the server issuing the certificate is poorly secured, and that there is a likelihood that other customers of the same CA may have poorly secured servers because the CA does not require its customers to secure their servers, or the CA does not assist its customers in properly setting up its servers. Additional irregularities include using weak and insecure ciphersuites; use of known SSL/TLS vulnerabilities such as HEARTBLEED, POODLE, FREAK, CRIME, BEAST, and others; incorrect setup of the certificate on the wrong server, known as "certificate name mismatch"; or weak SSL implementations such as SSL 2.0 or SSL 3.0.

Analysis Engine 250 may determine that the certificate originated from or was located on a known phishing site. Analysis Engine 250 may do this by looking in the certificate's repository/db to find out more information, e.g., the issuer name and where the certificate was found (could be certificate transparency log servers, a web crawler collecting IP addresses, etc.).

Analysis Engine 250 may determine that the certificate originated from or was located on a malware site. Analysis Engine 250 may do this by comparing the certificate to a list of malware or by scanning the site for known malware. Details within a certificate identify the issuer of a certificate. These details may include a certificate chain, or may include organization information which could be correlated to bad companies issuing bad certificates.

Analysis Engine 250 may determine that a certificate has insecure attributes. Analysis Engine 250 may do so by comparing the certificate with know problematic profiles, including, e.g., EKUs that shouldn't be in the same certificate, a SHA1 hash, a weak private key such as a 1024 bit key length (which is shorter and easier to crack), weak encryption altorithms, and other attributes well-known in the art.

Analysis Engine 250 may determine that a certificate has internal names in a Subject Alternative Name ("SAN"). For example, Analysis Engine 250 may determine that a domain name does not contain a resolvable FQDN, and that it has not, therefore issued correctly. Analysis Engine 250 may also determine that a certificate's SAN has multiple domains for the same certificate.

Analysis Engine 250 may determine that the issuing CA, or the owner of the domain, has received bad press. Analysis Engine 250 may make this determination by searching for news for media reports, or by using a news or monitoring service, or in any other well-known way for seeking out reports on a particular entity.

Analysis Engine 250 may also rely on online reviews for the issuing CA. These reviews may exist at any of multiple websites and outlets that rate or otherwise review CAs, or could be a website or outlet that aggregates CA reviews or ratings, or any other source of CA ratings or reviews.

Analysis Engine 250 may extract and/or analyze any combination or subset of the certificate resource information in the Certificate Resource Information Repository. Analysis Engine 250 may be developed, distributed, and/or controlled by any entity.

At step 270 of FIG. 1, Score Assignment System 270 assigns one or more security scores to a certificate authority. Although termed herein a "security score" for convenience of discussion, the "security score" could comprise any score assigned to a certificate, even if the score is used for a purpose unrelated to security or only partially related to security.

A security score may be a rank, grade, rating, degree, level, group, quality, standard, status, brand, order, tier, class, category, classification, or any analogous measurement or metric.

In step 130 of FIG. 1, based at least in part on the analysis from Analysis Engine 250, Score Generation System 270 may generate and assign one or more security scores to at least one of the certificates in Certificate Resource Information Repository 230 or associated CAs. Different algorithms or formulas may be used to generate different security scores for the same certificate or certificate authority. For example, one formula may heavily weight a CA's issuance of other certificates for known phishing sites, while another formula may rely more heavily on irregular certificate configurations. A person of ordinary skill will recognize that score assignment algorithms may range from trivial to complex.

For example, Score Generation System 270 may assign a security score which is a number from 1-10, where 10 indicates the highest level of trustworthiness or security, and 1 indicates the lowest level of trustworthiness or security. The Security Score Generator may assign a 10 to a certificate authority where all information for all certificates associated with the certificate authority suggest trustworthiness. The Security Score Generator may assign a 1 where a significant amount of information for certificates associated with the certificate authority suggest trustworthiness.

The Score Generation System 270 may assign a security score that is a color from the set of red, yellow, and green, where red indicates untrustworthiness, yellow indicates that there are some signs of untrustworthiness, and green indicates trustworthiness.

The Score Generation System 270 may assign a security score that is a word characteristic such as "trusted" or "untrusted."

The Score Generation System 270 may rank one or more certificate authorities relative to each other. The ranking may be accomplished by assigning numerical security scores to multiple CAs and then comparing the CA's respective scores to generate a ranking. Many other ranking schemes are within the knowledge and skill of a person of ordinary skill in the art.

A person of ordinary skill in the art will recognize that many algorithms and approaches, as well as trivial variants of such, may be employed to assign security score(s) to one or more certificate authorities or certificates. These algorithms, approaches, and variants are within the scope of this invention.

Security Review System 280 may provide security scores for one or more certificates or CAs to an interested party. The interested party may be a browser, network client, internet client, client browsing agent, website operator, an owner of a domain, a network security administrator, an entity using a certificate to authenticate its website, or any other party having in interest in certificate or CA trustworthiness. FIG. 1B shows an exemplary flowchart 150 for one embodiment of a obtaining and relying on a security score for a CA. For example, in step 160, security scores for one or more CAs may be provided to a client's browser, such as Internet Explorer. In step 170, the browser may employ the security scores to determine whether to trust a CA, the extent to which a CA may be trusted, the context in which a CA may be trusted, and validations that may need to employed before trusting a CA. In one embodiment, a browser may determine that CA is trustworthy only for a particular set of domains or websites. In another embodiment, a browser may determine that a CA should only be relied upon if several other more trusted browsers do not issue a certificate. In another embodiment, a browser may determine to trust a CA only if another CA, possibly with specific minimum security characteristics, also issues a certificate for the same site.

In another example, an operator or security administrator for one or more domains and associated websites may request security scores related to its domains and websites. These scores may include security scores for some or all CAs who provide certificates for the operator's or security administrator's websites. The provided security scores may additionally or alternatively include security scores for all certificate authorities who provide certificates for phishing cites masquerading as the security administrator's websites. The security administrator may further be provided with security scores for certificates provided by its websites, or for certificates attempting to masquerade as the security administrator's website. The provided security scores may further comprise processing and analysis of the security scores, including but not limited to groupings of certificates or CAs by trustworthiness level, graphs, charts, statistical analysis of distributions of security scores, and many other variants which are well known and within the grasp of a person of ordinary skill Because it may be dangerous to provide security scores and related information to an arbitrary party, Domain Verification Authority ("DVA") 290 may verify the identity of a requesting party before providing security scores and related information. The danger results because the security scores and related information will frequently discloses weaknesses in a particular domain's security, and will identify potentially untrustworthy certificate authorities that may be used to breach a website's security, such as through phishing attacks. By verifying the identity of a requesting party, i.e., by ensuring that the requesting party owns and operates the domains for which it is requesting security scores and related information, the potentially compromising information is distributed only to the parties to whom the security vulnerabilities present a risk, and is withheld from parties who may desire to use the information to exploit security vulnerabilities.

What is claimed is:

1. A method for determining trustworthiness of a certificate authority, comprising:

obtaining a security score for the certificate authority, comprising;

obtaining certificate resource information from one or more networks;

analyzing the certificate resource information;

assigning a security score to the certificate authority based at least in part on the analysis of the certificate resource information; and relying, based on the security score, on a certificate issued by the certificate authority, comprising at least two of:

determining to trust the certificate, based on the security score, for a set of some but not all websites;

determining to trust the certificate, based on the security score, if a second certificate from a second certificate authority corroborates the certificate; and determining to trust the certificate, based on the security score, if no certificates from higher-ranked certificate authorities are available;

wherein analyzing the certificate resource information comprises determining, for at least one certificate in the certificate resource information, at least two of:

that a domain from which the at least one certificate was received is a phishing attempt;

that the certificate has internal names in the certificate's subject alternative name field;

that the issuing certificate authority has received bad press.

2. The method of claim 1, wherein the security score is a ranking for the certificate authority.

3. The method of claim 1, wherein relying, based on the security score, on a certificate issued by the certificate authority, comprises determining to trust the certificate, based on the security score, for a set of some but not all websites.

4. The method of claim 1, wherein relying, based on the security score, on a certificate issued by the certificate authority, comprises determining to trust the certificate, based on the security score, if a second certificate from a second certificate authority corroborates the certificate.

5. The method of claim 1, wherein relying, based on the security score, on a certificate issued by the certificate authority, comprises determining to trust the certificate, based on the security score, if no certificates from higher-ranked certificate authorities are available.

6. The method of claim 1, wherein analyzing the certificate resource information comprises determining, for at least one certificate in the certificate resource information, that a domain from which the at least one certificate was received is a phishing attempt.

7. The method of claim 1, wherein analyzing the certificate resource information comprises determining, for at least one certificate in the certificate resource information, that the issuing certificate authority has received bad press.

8. The method of claim 1, wherein analyzing the certificate resource information comprises determining, for at least one certificate in the certificate resource information, at least one of:
that the domain from which the at least one certificate was received has received bad press; and
that the owner of the domain has received bad press.

9. A computing device for determining trustworthiness of a certificate authority, the computing device comprising a processor and a memory, wherein the memory stores instructions that, when executed on the processor, cause the computing device to perform a method comprising:
obtaining a security score for the certificate authority, comprising;
obtaining certificate resource information from one or more networks;
analyzing the certificate resource information;
assigning a security score to the certificate authority based at least in part on the analysis of the certificate resource information; and
relying, based on the security score, on a certificate issued by the certificate authority, comprising at least two of:
determining to trust the certificate, based on the security score, for a set of some but not all websites;
determining to trust the certificate, based on the security score, if a second certificate from a second certificate authority corroborates the certificate; and
determining to trust the certificate, based on the security score, if no certificates from higher-ranked certificate authorities are available;
wherein analyzing the certificate resource information comprises determining, for at least one certificate in the certificate resource information, at least two of:
that a domain from which the at least one certificate was received is a phishing attempt;
that the certificate has internal names in the certificate's subject alternative name field;
that the issuing certificate authority has received bad press
that a that the issuing certificate authority has received bad press.

10. The computing device of claim 9, wherein the security score is a ranking for the certificate authority.

11. The computing device of claim 9, wherein relying, based on the security score, on a certificate issued by the certificate authority, comprises determining to trust the certificate, based on the security score, for a set of some but not all websites.

12. The computing device of claim 9, wherein relying, based on the security score, on a certificate issued by the certificate authority, comprises determining to trust the certificate, based on the security score, if a second certificate from a second certificate authority corroborates the certificate.

13. The computing device of claim 9, wherein relying, based on the security score, on a certificate issued by the certificate authority, comprises determining to trust the certificate, based on the security score, if no certificates from higher-ranked certificate authorities are available.

14. The computing device of claim 9, wherein analyzing the certificate resource information comprises determining, for at least one certificate in the certificate resource information, that a domain from which the at least one certificate was received is a phishing attempt.

15. The computing device of claim 9, wherein analyzing the certificate resource information comprises determining, for at least one certificate in the certificate resource information, that the issuing certificate authority has received bad press.

16. The computing device of claim 9, wherein analyzing the certificate resource information comprises determining, for at least one certificate in the certificate resource information, at least one of:
that the domain from which the at least one certificate was received has received bad press; and
that the owner of the domain has received bad press.

17. A non-transitory computer-readable medium storing instructions that, when executed on a processor of a computing device, cause the computing device to perform a method for determining trustworthiness of a certificate authority, comprising:
obtaining a security score for the certificate authority, comprising;
obtaining certificate resource information from one or more networks;
analyzing the certificate resource information;
assigning a security score to the certificate authority based at least in part on the analysis of the certificate resource information; and
relying, based on the security score, on a certificate issued by the certificate authority, comprising at least two of:
determining to trust the certificate, based on the security score, for a set of some but not all websites;
determining to trust the certificate, based on the security score, if a second certificate from a second certificate authority corroborates the certificate; and
determining to trust the certificate, based on the security score, if no certificates from higher-ranked certificate authorities are available;
wherein analyzing the certificate resource information comprises determining, for at least one certificate in the certificate resource information, at least two of:
that a domain from which the at least one certificate was received is a phishing attempt;
that the certificate has internal names in the certificate's subject alternative name-field;
that the issuing certificate authority has received bad press.

18. The non-transitory computer-readable medium of claim 17, wherein the security score is a ranking for the certificate authority.

19. The non-transitory computer-readable medium of claim 17, wherein relying, based on the security score, on a certificate issued by the certificate authority, comprises determining to trust the certificate, based on the security score, if a second certificate from a second certificate authority corroborates the certificate.

20. The non-transitory computer-readable medium of claim 17, wherein relying, based on the security score, on a certificate issued by the certificate authority, comprises determining to trust the certificate, based on the security score, if no certificates from higher-ranked certificate authorities are available.

* * * * *